(12) United States Patent
Fuller et al.

(10) Patent No.: US 7,985,805 B2
(45) Date of Patent: Jul. 26, 2011

(54) POLYELECTROLYTE MEMBRANES COMPRISED OF BLENDS OF PFSA AND SULFONATED PFCB POLYMERS

(75) Inventors: Timothy J. Fuller, Pittsford, NY (US); Sean M MacKinnon, Fairport, NY (US); Michael R. Schoeneweiss, W. Henrietta, NY (US); Craig S. Gittleman, Rochester, NY (US)

(73) Assignee: GM Global Technology Operations LLC, Detroit, MI (US)

(*) Notice: Subject to any disclaimer, the term of this patent is extended or adjusted under 35 U.S.C. 154(b) by 246 days.

(21) Appl. No.: 12/434,749

(22) Filed: May 4, 2009

(65) Prior Publication Data
US 2009/0278083 A1 Nov. 12, 2009

Related U.S. Application Data

(60) Provisional application No. 61/052,148, filed on May 9, 2008.

(51) Int. Cl.
*C08F 214/14* (2006.01)
(52) U.S. Cl. ............... 525/326.2; 526/250; 526/252; 526/253; 526/254; 525/199; 525/200
(58) Field of Classification Search ............... 525/199, 525/200, 326.2; 526/250, 252, 253, 254
See application file for complete search history.

(56) References Cited

U.S. PATENT DOCUMENTS

| | | | |
|---|---|---|---|
| 5,006,408 A * | 4/1991 | Green et al. | 428/395 |
| 5,021,602 A | 6/1991 | Clement et al. | |
| 5,037,917 A | 8/1991 | Babb et al. | |
| 5,066,746 A | 11/1991 | Clement et al. | |
| 5,159,037 A | 10/1992 | Clement et al. | |
| 5,159,038 A | 10/1992 | Babb et al. | |
| 5,910,378 A | 6/1999 | Debe et al. | |
| 6,124,060 A | 9/2000 | Akita et al. | |
| 6,183,668 B1 | 2/2001 | Debe et al. | |
| 6,277,512 B1 | 8/2001 | Hamrock et al. | |
| 6,384,167 B2 | 5/2002 | DesMarteau et al. | |
| 6,444,343 B1 | 9/2002 | Prakash et al. | |
| 6,523,699 B1 | 2/2003 | Akita et al. | |
| 6,559,237 B1 | 5/2003 | Mao et al. | |
| 6,847,518 B2 | 1/2005 | Fukuda et al. | |
| 6,875,537 B2 | 4/2005 | Tani et al. | |
| 6,926,984 B2 | 8/2005 | Asano et al. | |
| 6,933,068 B2 | 8/2005 | Asano et al. | |
| 6,953,653 B2 | 10/2005 | Smith et al. | |
| 6,986,962 B2 | 1/2006 | Oyanagi et al. | |
| 7,001,929 B2 | 2/2006 | Goto et al. | |
| 7,045,241 B2 | 5/2006 | Akita et al. | |
| 2001/0018144 A1 | 8/2001 | Watakabe et al. | |
| 2002/0014405 A1 | 2/2002 | Arcella et al. | |
| 2003/0017379 A1 | 1/2003 | Menashi | |
| 2004/0214058 A1 | 10/2004 | Tada et al. | |
| 2004/0214065 A1 | 10/2004 | Kanaoka et al. | |
| 2005/0014927 A1 | 1/2005 | Akita | |
| 2005/0043487 A1 | 2/2005 | Felix et al. | |
| 2005/0048342 A1 | 3/2005 | Wakahoi et al. | |
| 2005/0053810 A1 | 3/2005 | Kato et al. | |
| 2005/0058864 A1 | 3/2005 | Goebel | |
| 2005/0064260 A1 | 3/2005 | Otsuki et al. | |
| 2005/0100770 A1 | 5/2005 | Sugawara et al. | |
| 2005/0106440 A1 | 5/2005 | Komiya | |
| 2005/0116206 A1 | 6/2005 | Kakuta et al. | |
| 2005/0130024 A1 | 6/2005 | Otsuki et al. | |
| 2005/0142397 A1 | 6/2005 | Wakahoi et al. | |
| 2005/0143530 A1 | 6/2005 | Iwadate et al. | |
| 2005/0175886 A1 | 8/2005 | Fukuda et al. | |
| 2005/0197467 A1 | 9/2005 | Komiya et al. | |
| 2005/0227138 A1 | 10/2005 | Fukuda et al. | |
| 2005/0233181 A1 | 10/2005 | Wariishi et al. | |
| 2005/0260474 A1 | 11/2005 | Asano et al. | |
| 2006/0019147 A1 | 1/2006 | Fukuda et al. | |
| 2006/0127728 A1 | 6/2006 | Otsuki et al. | |
| 2006/0177719 A1 | 8/2006 | Fuller et al. | |
| 2007/0042242 A1 | 2/2007 | Tada et al. | |
| 2007/0099054 A1 | 5/2007 | Fuller et al. | |
| 2007/0141237 A1 | 6/2007 | Okiyama et al. | |
| 2008/0027152 A1 | 1/2008 | Maier et al. | |
| 2009/0278083 A1 | 11/2009 | Fuller et al. | |
| 2009/0278091 A1 | 11/2009 | MacKinnon et al. | |
| 2009/0281245 A1 | 11/2009 | MacKinnon et al. | |
| 2009/0281262 A1 | 11/2009 | MacKinnon et al. | |
| 2009/0281270 A1 | 11/2009 | Fuller et al. | |

FOREIGN PATENT DOCUMENTS

| | | |
|---|---|---|
| JP | 2003535929 T | 12/2003 |
| JP | 2005129298 A | 5/2005 |
| JP | 2005166557 A | 6/2005 |
| JP | 2005179380 A | 7/2005 |
| JP | 2009 249 487 A | 10/2009 |
| WO | 0022012 | 4/2000 |
| WO | 2004/051776 | 6/2004 |
| WO | 2007/052954 A1 | 5/2007 |

OTHER PUBLICATIONS

Smith, D.W. et al., "Perfluorocyclobutane Aromatic Polyethers. Synthesis and Characterization of New Siloxane-Containing Fluoropolymers," Macromolecules 1996, v. 29, pp. 852-860.
Smith, D.W. et al., "Perfluorocyclobutane (PFCB) polyaryl ethers: versatile coatings material," J. of Fluorine Chem., v. 104, pp. 109-117 (2000).
Souzy, R. et al., "Functional fluoropolymers for fuel cell membranes," Solid State Ionics, v. 176, pp. 2839-2848 (2005).
Souzy, R. et al., "Functional fluoropolymers for fuel cell membranes," Prog. Polm. Sci. 30, 2005, pp. 644-687.
Ford, L.A. et al., "New Aromatic Perfluorovinyl Ether Monomers Containing the Sulfonimide Acid Functionality," Polymeric Materials Science & Eng., v. 83, 2000, pp. 10-11 (American Chemical Society).
Souzy, R. et al., "Synthesis and (co)polymerization of monofluoro, difluoro, trifluorostyrene and ((trifluorovinyl)oxy) benzene," Prog. Polm. Sci. 29 (2004), pp. 75-106.

\* cited by examiner

*Primary Examiner* — Bernard Lipman
(74) *Attorney, Agent, or Firm* — Brooks Kushman P.C.

(57) ABSTRACT

A polymer blend useful as an ion conductor in fuel cells includes a first polymer having a cyclobutyl moiety and a second polymer include a sulfonic acid group.

18 Claims, 1 Drawing Sheet

POLYELECTROLYTE MEMBRANES COMPRISED OF BLENDS OF PFSA AND SULFONATED PFCB POLYMERS

CROSS-REFERENCE TO RELATED APPLICATIONS

This application claims the benefit of U.S. provisional application Ser. No. 61/052,148, filed May 9, 2008.

TECHNICAL FIELD

The field to which the disclosure generally relates includes polymer electrolyte and fuel cells.

BACKGROUND

Polymer electrolytes play an important part in electrochemical devices such as batteries and fuel cells. To achieve optimal performance, the polymer electrolyte must maintain a high ionic conductivity and mechanical stability at both high and low relative humidity. The polymer electrolyte also needs to have excellent chemical stability for long product life and robustness. Fluorinated random copolymers have been explored as electrolytes for fuel cells. Due to their inherent random chain configuration, however, random copolymers typically suffer from water swelling at high humidity and excess membrane shrinkage at low humidity. A random copolymer membrane lacks the mechanical robustness to withstand the rigors of hydration and dehydration within an operating fuel cell. Thus, there is a need for an improved polymer electrolyte that maintains robust mechanical properties and high ionic conductivity at wide range of humidity conditions.

Accordingly, an improved polymer electrolyte molecular architecture and a process of synthesizing such a polymer electrolyte are desired.

SUMMARY OF THE INVENTION

The present invention solves one or more problems of the prior art by providing in at least one embodiment a polymer blend including a first polymer having a cyclobutyl moiety and a second polymer having the following chemical moiety:

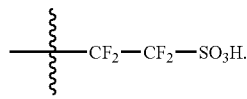

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF THE PREFERRED EMBODIMENT(S)

Figure 1:
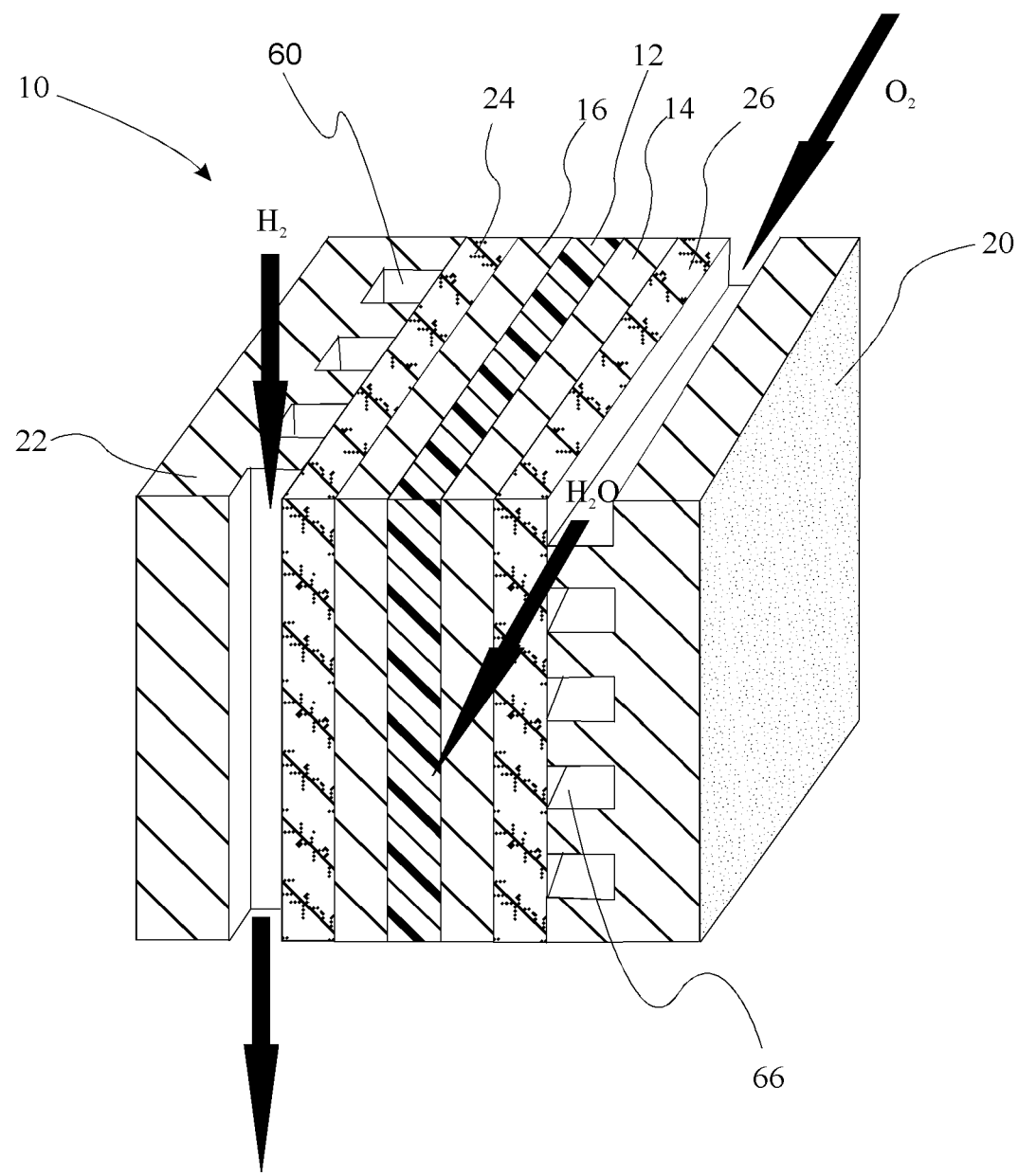
FIG. 1 provides a schematic illustration of a fuel cell incorporating the polymers of an embodiment of the present invention.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies *mutatis mutandis* to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

With reference to FIG. 1, a fuel cell that incorporates a polymer electrolyte including polymers from the invention is provided. PEM fuel cell 10 includes polymeric ion conductive membrane 12 disposed between cathode catalyst layer 14 and anode catalyst layer 16. Polymeric ion conductive membrane 12 includes one or more of the polymers set forth below. Fuel cell 10 also includes conductive plates 20, 22, gas channels 60 and 66, and gas diffusion layers 24 and 26.

In an embodiment of the present invention, a polymer blend includes a first polymer having a cyclobutyl moiety and a second polymer having the following chemical moiety:

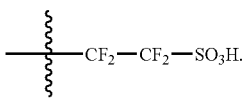

In a variation of the present embodiment, the second polymer is a perfluorosulfonic acid polymer (PFSA). In a refinement, such PFSAs are a copolymer containing a polymerization unit based on a perfluorovinyl compound represented by:

$$CF_2=CF-(OCF_2CFX^1)_m-O_r-(CF_2)_q-SO_3H$$

where m represents an integer of from 0 to 3, q represents an integer of from 1 to 12, r represents 0 or 1, and $X^1$ represents a fluorine atom or a trifluoromethyl group) and a polymerization unit based on tetrafluoroethylene.

In a further refinement, the second polymer is selected from the group consisting:

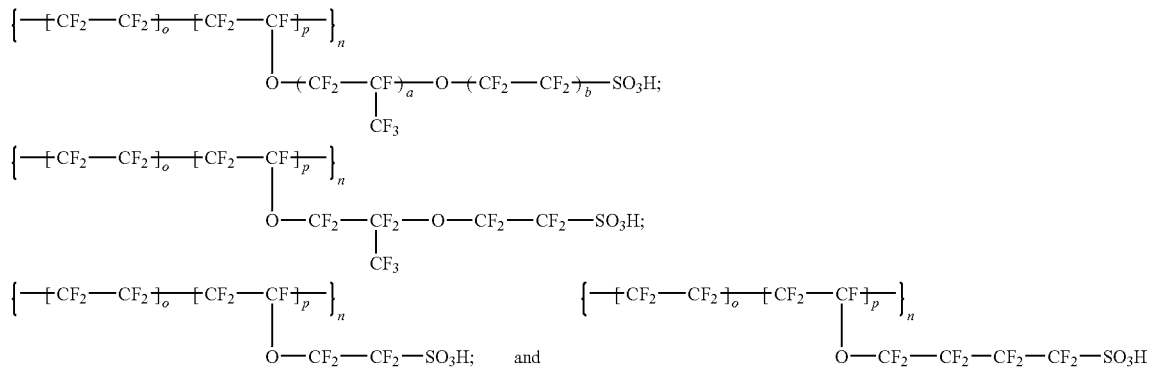

wherein:
o is 0 to 10,
p is greater or equal to 1,
n is greater than 10. In a variation, n is great than 100. In still another variation, n is greater than 1000,
a is from 0 to 3 and
b is from 1 to 12.

In another variation of the present invention, the polymer blend further includes a non-ionic polymer such as a fluoro-elastomer. The fluoro-elastomer may be any elastomeric material comprising fluorine atoms. The fluoro-elastomer may comprise a fluoropolymer having a glass transition temperature below about 25° C. or preferably, below 0° C. The fluoro-elastomer may exhibit an elongation at break in a tensile mode of at least 50% or preferably at least 100% at room temperature. The fluoro-elastomer is generally hydrophobic and substantially free of ionic group. The fluoro-elastomer polymer chain may have favorable interaction with the hydrophobic segment of the first polymer that includes a cyclobutyl moiety described above. Such favorable interaction may facilitate formation of a stable, uniform and intimate blend of the two materials. The fluoro-elastomer may be prepared by polymerizing at least one fluoro-monomer such as vinylidene fluoride, tetrafluoroethylene, hexafluoropropylene, vinylfluoride, vinylchloride, chlorotrifluoroethylene, perfluoromethylvinyl ether, and trifluoroethylene. The fluoro-elastomer may also be prepared by copolymerizing at least one fluoro-monomer and at least one non-fluoro-monomer such as ethylene, propylene, methyl methacrylate, ethyl acrylate, styrene and the like. The fluoro-elastomer may be prepared by free radical polymerization or anionic polymerization in bulk, emulsion, suspension and solution. Examples of fluoro-elastomers include poly(tetrafluoroethlyene-co-ethylene), poly(vinylidene fluoride-co-hexafluoropropylene), poly(tetrafluoroethylene-co-propylene), polyvinylidene difluoride, terpolymer of vinylidene fluoride, hexafluoropropylene and tetrafluoroethylene, and terpolymer of ethylene, tetrafluoroethylene and perfluoromethylvinylether. Some of the fluoro-elastomers are commercially available from Arkema under trade name Kynar Flex and Solvay Solexis under the trade name Technoflon®, from 3M under the trade name Dyneon®, and from DuPont under the trade name Viton®. For example, Kynar Flex 2751 is a copolymer of vinylidene fluoride and hexafluoropropylene with a melting temperature between about 130° C. and 140° C. The glass transition temperature of Kynar Flex 2751 is about −40 to −44° C. The fluoro-elastomer may further comprise a curing agent to allow crosslinking reaction after blended with a first polymer that includes a cyclobutyl moiety.

In one refinement, the first polymer is present in an amount from about 1 to about 99 weight percent of the total weight of the polymer blend. In another refinement, the first polymer is present in an amount from about 20 to about 80 weight percent of the total weight of the polymer blend. In another refinement, the first polymer is present in an amount from about 30 to about 70 weight percent of the total weight of the polymer blend. In another refinement, the first polymer is present in an amount from about 50 to about 75 weight percent of the total weight of the polymer blend. In still another refinement, the first polymer is present in an amount from about 25 to about 75 weight percent of the total weight of the polymer blend. In another refinement, the second polymer is present in an amount from about 99 to about 1 weight percent of the total weight of the polymer blend. In still another refinement, the second polymer is present in an amount from about 80 to about 20 weight percent of the total weight of the polymer blend. In still another refinement, the second polymer is present in an amount from about 70 to about 30 weight percent of the total weight of the polymer blend. In still another refinement, the second polymer is present in an amount from about 50 to about 25 weight percent of the total weight of the polymer blend. In still another refinement, the second polymer is present in an amount from about 75 to about 25 weight percent of the total weight of the polymer blend.

As set forth above, the first polymer includes a perfluorocyclobutyl (PFCB) moiety (PFCB). Examples of such moieties include:

[Structural formulas of fluorinated cyclobutyl moieties with F substituents]

As set forth above, the first polymer includes cyclobutyl moiety. Suitable polymers having cyclobutyl moieties are disclosed in U.S. Pat. Pub. No. 20070099054, the entire disclosure of which is hereby incorporated by reference. In variation of the present invention, the first polymer comprising polymer segments 1 and 2:

$$[E_1(SO_2X)_d]\text{—}P_1\text{-}Q_1\text{-}P_2 \qquad 1$$

$$E_2\text{-}P_3\text{-}Q_2\text{-}P_4 \qquad 2$$

wherein:

$E_1(SO_2X)_d$ is a sulfonated aromatic containing moiety;

$E_1$ is an aromatic containing moiety;

$E_2$ is an unsulfonated aromatic-containing and/or aliphatic-containing moiety;

X is an —OH, a halogen, an ester, or $$-\overset{H}{N}-\underset{\underset{O}{\|}}{\overset{\overset{O}{\|}}{S}}-R_4;$$

d is the number of $(SO_2X)_d$ attached to $E_1$. In one refinement, d is equal to the number of aromatic rings in $E_1$. In another refinement, each aromatic ring in $E_1$ can have 0, 1, 2, 3, or 4 $SO_2X$ groups;

$P_1$, $P_2$, $P_3$, $P_4$ are each independently: absent, —O—, —S—, —SO—, —CO—, —SO$_2$—, —NR$_1$H—, NR$_2$—, or —R$_3$—, and $R_2$ is $C_{1-125}$ alkyl, $C_{1-125}$ aryl or $C_{1-125}$ arylene;

$R_3$ is $C_{1-125}$ alkylene, $C_{1-125}$ perfluoroalkylene, perfluoroalkyl ether, alkylether, or $C_{1-125}$ arylene;

$R_4$ is trifluoromethyl, $C_{1-125}$ alkyl, $C_{1-125}$ perfluoroalkylene, $C_{1-125}$ aryl, or another $E_1$ group; and $Q_1$, $Q_2$ are each independently a fluorinated cyclobutyl moiety.

In another variation of the present embodiment, the first polymer comprises segments 3 and 4:

$$\begin{array}{c} E_1\text{—}P_1\text{—}Q_1\text{—}P_2 \\ | \\ R_8(SO_3X)_d \end{array} \qquad 3$$

$$E_2\text{—}P_3\text{—}Q_2\text{—}P_4 \qquad 4$$

wherein:

$E_1$, $E_2$ are each independently an aromatic-containing and/or aliphatic-containing moiety;

X is an —OH, a halogen, an ester, or $$-\overset{H}{N}-\underset{\underset{O}{\|}}{\overset{\overset{O}{\|}}{S}}-R_4;$$

d is the number of $(SO_2X)_d$ attached to $E_1$. In one refinement, d is equal to the number of aromatic rings in $E_1$. In another refinement, each aromatic ring in $E_1$ can have 0, 1, 2, 3, or 4 $SO_2X$ groups. In still another refinement, d is an integer from 1 to 4 on average;

$P_1$, $P_2$, $P_3$, $P_4$ are each independently: absent, —O—, —S—, —SO—, —CO—, —SO$_2$—, —NH—, NR$_2$—, or —R$_3$—, and $R_2$ is $C_{1-125}$ alkyl, $C_{1-125}$ aryl or $C_{1-125}$ arylene;

$R_3$ is $C_{1-125}$ alkylene, $C_{1-125}$ perfluoroalkylene, perfluoroalkyl ether, alkylether, or $C_{1-125}$ arylene;

$R_4$ is trifluoromethyl, $C_{1-125}$ alkyl, $C_{1-125}$ perfluoroalkylene, $C_{1-125}$ aryl, or another $E_1$ group;

$R_8(SO_2X)_d$ is a sulfonated aromatic containing moiety. In a refinement, $R_8$ is $C_{1-125}$ alkylene, $C_{1-125}$ perfluoroalkylene, perfluoroalkyl ether, alkylether, or $C_{1-125}$ arylene; and $Q_1$, $Q_2$ are each independently a fluorinated cyclobutyl moiety.

In another variation of the present embodiment, the first polymer comprises segments 5 and 6:

$$E_1(SO_2X)_d\text{—}P_1\text{-}Q_1\text{-}P_2 \qquad 5$$

$$E_2\text{-}P_3\text{-}Q_2\text{-}P_4 \qquad 6$$

connected by a linking group $L_1$ to form polymer units 7 and 8:

$$-(\!\!-E_2\text{-}P_3\text{-}Q_2\text{-}P_4\!-\!)_j\!-L_1\!-\!(\!-E_1(SO_2X)_d\text{-}P_1\text{-}Q_1\text{-}P_2\!-\!)_i\!- \qquad 7$$

$$-(\!\!-E_2\text{-}P_3\text{-}Q_2\text{-}P_4\!-\!)_j\!-L_1\!-\!(\!-E_1(SO_2X)_d\text{-}P_1\text{-}Q_1\text{-}P_2\!-\!)_i\!- \qquad 8$$

wherein:

$E_1(SO_2X)_d$ is a sulfonated aromatic-containing moiety;

$E_2$ is an unsulfonated aromatic-containing and/or aliphatic-containing moiety;

$L_1$ is a linking group;

X is an —OH, a halogen, an ester, or $$-\overset{H}{N}-\underset{\underset{O}{\|}}{\overset{\overset{O}{\|}}{S}}-R_4;$$

d is a number of $(SO_2X)$ functional groups attached to $E_1$;

$P_1$, $P_2$, $P_3$, $P_4$ are each independently absent, —O—, —S—, —SO—, —SO$_2$—, —CO—, —NH—, NR$_2$—, —R$_3$—, and $R_2$ is $C_{1-125}$ alkyl, $C_{1-125}$ aryl or $C_{1-125}$ arylene;

$R_3$ is $C_{1-125}$ alkylene, $C_{1-125}$ perfluoroalkylene, or $C_{1-125}$ arylene;

$R_4$ is trifluoromethyl, $C_{1-125}$ alkyl, $C_{1-125}$ perfluoroalkylene, $C_{1-125}$ aryl, or another $E_1$ group;

$Q_1$, $Q_2$ are each independently a fluorinated cyclobutyl moiety;

i is a number representing the repetition of polymer segment 1. Typically, i is from 1 to 200; and, j is a number representing the repetition of a polymer segment 2. Typically, j is from 1 to 200.

In still another variation of the present embodiment, the first polymer comprises polymer segments 9 and 10:

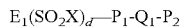  (9)

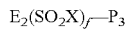  (10)

wherein:
$E_1$, $E_2$ is an aromatic or aliphatic-containing moiety wherein at least one of $E_1$ and $E_2$ include an aromatic group substituted with $-SO_2X$;

X is an $-OH$, a halogen, an ester, or

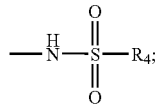

d is the number of ($SO_2X$) functional groups attached to $E_1$; In one refinement, d is equal to the number of aromatic rings in $E_1$. In another refinement, each aromatic ring in $E_1$ can have 0, 1, 2, 3, or 4 $SO_2X$ groups. In still another refinement, d is an integer from 1 to 4 on average;

f is the number of ($SO_2X$) functional groups attached to $E_2$; In one refinement, f is equal to the number of aromatic rings in $E_2$. In another refinement, each aromatic ring in $E_2$ can have 0, 1, 2, 3, or 4 $SO_2X$ groups. In still another refinement, f is an integer from 1 to 4 on average;

$P_1$, $P_2$, $P_3$ are each independently absent, $-O-$, $-S-$, $-SO-$, $-SO_2-$, $-CO-$, $-NH-$, $NR_2-$, $-R_3-$, and $R_2$ is $C_{1-125}$ alkyl, $C_{1-125}$ aryl or $C_{1-125}$ arylene;

$R_3$ is $C_{1-125}$ alkylene, $C_{1-125}$ perfluoroalkylene, perfluoroalkyl ether, alkyl ether, or $C_{1-125}$ arylene;

$R_4$ is trifluoromethyl, $C_{1-125}$ alkyl, $C_{1-125}$ perfluoroalkylene, $C_{1-125}$ aryl, or another $E_1$ group; and $Q_1$ is a fluorinated cyclobutyl moiety, with the proviso that when d is greater than zero, f is zero and when f is greater than zero d is zero.

Example for $Q_1$ and $Q_2$ in the above formulae are:

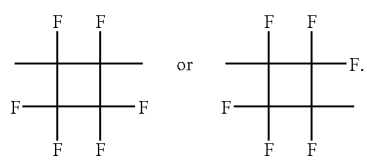

In each of the formulae 1-10, $E_1$ and $E_2$ include one or more aromatic rings. For example, $E_1$ and $E_2$, include one or more of the following moieties:

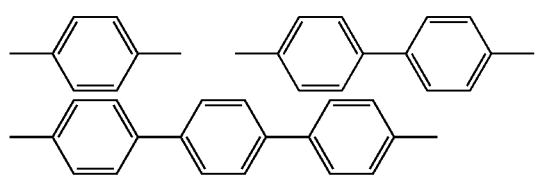

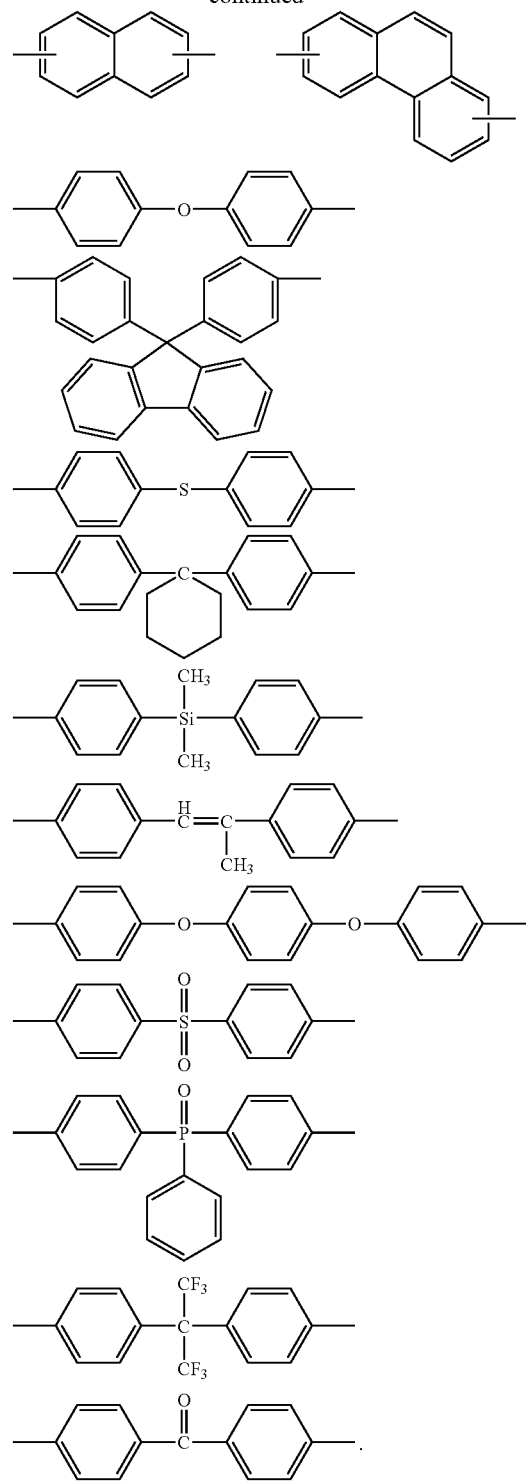

Examples of $L_1$ include the following linking groups:

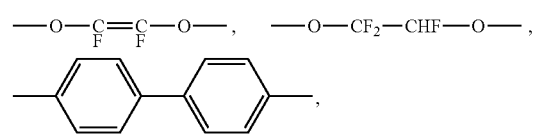

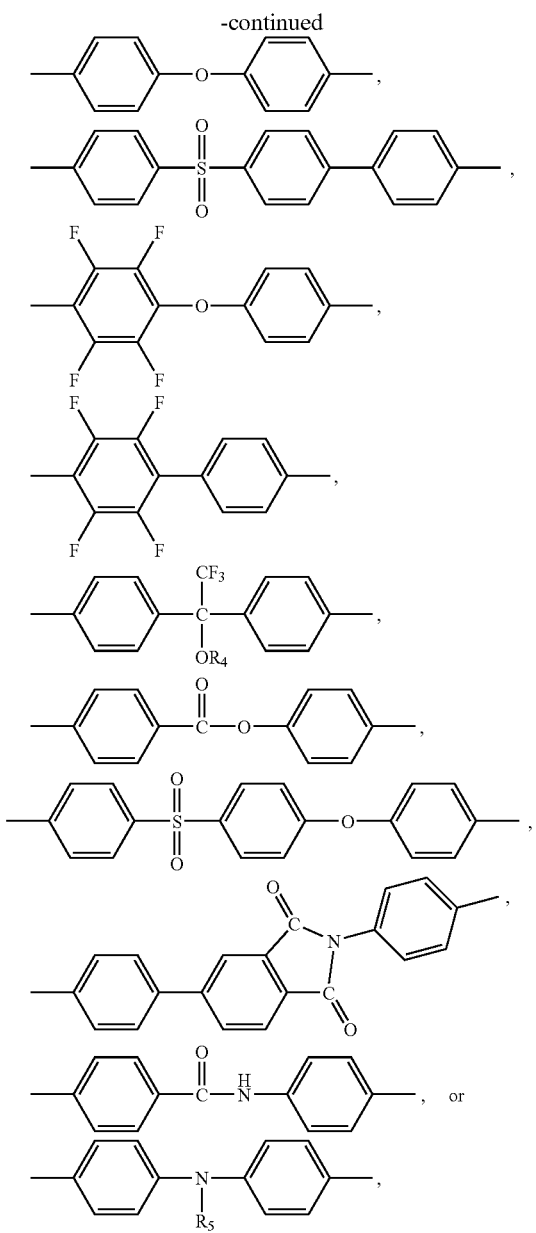

where $R_5$ is an organic group, such as an alkyl or acyl group.

The following examples illustrate the various embodiments of the present invention. Those skilled in the art will recognize many variations that are within the spirit of the present invention and scope of the claims.

Preparation of 20 wt. % Nafion® 1000 Solution in DMAc. Nafion® 1000 (DE 2020 PFSA solution from DuPont) is poured into an 8-inch×8-inch baking dish and dried at 60° C. for 16 hours. The PFSA residue is dissolved in N,N-dimethylacetamide (DMAc) with heating at 60° C. for 16 hours to form a 20 wt. % solids solution.

Preparation of 20 wt. % PFSA 900 EW Ionomer Solution in DMAC. A PFSA ionomer designated PFSA 900EW is treated similarly and a 20 wt. % solids solution in DMAc is formed.

Preparation of Sulfonated TRJ261 PFCB Block Copolvmer. A PFCB block copolymer designated TRJ261 is obtained from Tetramer Technologies, L.L.C., that consisted of an 8,000 molecular weight poly[para-biphenyl-perfluorocyclobutane] (BPVE 8K oligomer) which is copolymerized with the bis(perfluorovinyl ether) of hexafluoro-bisphenol A (6F monomer) in a 2 to 1 weight ratio. The resultant block copolymer has a 2.4 to 1 mole ratio of BPVE groups to 6F groups based on the ratio of 6F/PFCB integrations, as determined by $^{19}F$ NMR spectrometry, and a number average molecular weight of 28,574, as determined by size exclusion chromatography. The TRJ261 block copolymer (5 g) dissolved in methylene chloride (100 mL) is heated in an oil bath set at 400 C and chlorosulfonic acid (10 g) is then added with magnetic stirring. After 30 minutes, a purple, rubbery polymer precipitates from the reaction mixture. After 1 hour, the reaction solvent is decanted off from the purple precipitate, which is then washed with 50 mL of methylene chloride. The rubbery solid is then chopped in water (100 mL) using a Waring blender and then is boiled in water (2500 mL) for 1 hour. After filtration, water washing, and drying, a light-yellow fibrous polymer (5 g) is obtained. The polymer is further characterized as a membrane, which is prepared as described below.

Preparation of a 10 wt. % Solids Solution of Sulfonated TRJ261 PFCB Block Copolvmer in DMAc. The yellow, sulfonated TRJ261 polymer, that is made as described above, is dissolved in DMAc at 10 wt. % solution solids and is then pressure-filtered through a 5-μm Teflon, Millipore filter.

Membrane Preparation with Sulfonated TRJ261 Block Copolvmer in DMAc. The 10 wt. % solution, prepared as described above, is solution-coated onto glass with a Bird applicator bar having a 325 μm gap with a draw speed 12.5 mm/s using an Erichsen coater. The solution is then dried at 80° C. on a heated platen of the coater for 30 minutes. The membrane film is then floated off the glass by immersion in deionized water followed by air-drying. The resultant membrane has a water-uptake at 23° C. of 34.28 wt. % (53.0 vol. %) and at 100° C. of 438.6 wt. % (202.5 vol. %). The ion exchange capacity of the membrane is 2.01-meq $H^+$/g.

Preparation of a 50-wt. % Sulfonated-TRJ261 Blend with Nafion 1000®. A 10 wt. % solids solution of sulfonated-TRJ261 (1.0 g) in DMAc (9 g) and a 20 wt. % solution of Nafion 1000® (1 g) in DMAc (4 g) are mixed together for 1 hour on a roll mill and then the resultant mixture is centrifuged for 5 minutes to remove air bubbles. The resultant mixture is solution-coated onto glass with a Bird applicator bar having a 200 μm gap with a draw speed 12.5 mm/s using an Erichsen coater. The solution is then dried at 80° C. on a heated platen of the coater for 30 minutes. The membrane film is then floated off the glass by immersion in deionized water followed by air-drying.

Preparation of a 50 wt. % Sulfonated-TRJ261 Blend with PFSA 900EW. A 10 wt. % solids solution of sulfonated-TRJ261 (1.0 g) in DMAc (9 g) and a 20 wt. % solution of PFSA 900EW ionomer (1 g) in DMAc (4 g) are mixed together for 1 hour on a roll mill and then the resultant mixture is centrifuged for 5 minutes to remove air bubbles. The resultant mixture is solution-coated onto glass with a Bird applicator bar having a 200 μm gap with a draw speed 12.5 mm/s using an Erichsen coater. The solution is then dried at 80° C. on a heated platen of the coater for 30 minutes. The membrane film is then floated off the glass by immersion in deionized water followed by air-drying.

Fuel Cell Performance.

Fuel Cell Test with the Relative Humidity Sweep Protocol.

The films are evaluated as proton conducting membranes in fuel cell tests using 50cm$^2$-hardware and electrodes of platinum on carbon catalyst coated on diffusion media (CCDM) with a microporous layer. Humidified gases are used: hydrogen on the anode and air on the cathode. A relative humidity versus cell voltage sweep protocol is followed to determine the low relative humidity performance of the films. In this test, the cell voltage is determined while the humidification level of the anode and cathode inlets is maintained at the same percent relative humidity. The degree of humidification is then varied stepwise between 10% and 100% (anode and cathode inlets) in multiples of 10%, at 80° C. and 95° C., respectively. Concomitantly, the current density is maintained at 0.4 and 1.2 A/cm², respectively. The 95° C. performance of membranes made with the blends of PFCB and PFSA are dramatically improved over that of a membrane made with the sulfonated PFCB alone, and the performance of the blends are nearly comparable to that of state-of-the art PFSA membranes alone.

The above description of embodiments of the invention is merely exemplary in nature and, thus, variations thereof are not to be regarded as a departure from the spirit and scope of the invention.

What is claimed is:

1. A polymer blend comprising:
   a first polymer having a cyclobutyl moiety; and
   a second polymer having a chemical moiety having formula (1):

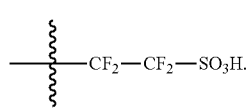
(1)

2. The polymer blend of claim 1 wherein the second polymer is a perfluorosulfonic acid polymer.

3. The polymer blend of claim 1 wherein the cyclobutyl moiety is:

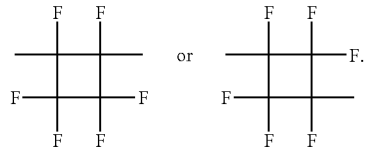

4. The polymer blend of claim 3 wherein the first polymer comprises polymer segments 1 and 2:

$[E_1(SO_2X)_d]$—$P_1$-$Q_1$-$P_2$          1

$E_2$-$P_3$-$Q_2$-$P_4$          2 wherein:
   $E_1(SO_2X)_d$ is a sulfonated aromatic containing moiety;
   $E_1$ is an aromatic containing moiety;
   $E_2$ is an unsulfonated aromatic-containing and/or aliphatic-containing moiety;
   X is an —OH, a halogen, an ester, or

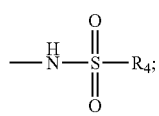

d is the number of $(SO_2X)_d$ attached to $E_1$;
   $P_1$, $P_2$, $P_3$, $P_4$ are each independently: absent, —O—, —S—, —SO—, —CO—, —$SO_2$—, —$NR_1H$—, $NR_2$—, or —$R_3$—;
   $R_2$ is $C_{1-25}$ alkyl, $C_{1-25}$ aryl or $C_{1-25}$ arylene;
   $R_3$ is $C_{1-25}$ alkylene, $C_{1-25}$ perfluoroalkylene, perfluoroalkyl ether, alkylether, or $C_{1-25}$ arylene;
   $R_4$ is trifluoromethyl, $C_{1-25}$ alkyl, $C_{1-25}$ perfluoroalkylene, $C_{1-25}$ aryl, or another $E_1$ group; and
   $Q_1$, $Q_2$ are each independently a fluorinated cyclobutyl moiety.

5. The polymer blend of claim 3 wherein the first polymer comprises segments 3 and 4:

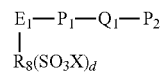
3

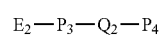
4 wherein:
   $E_1$, $E_2$ are each independently an aromatic-containing and/or aliphatic-containing moiety;
   X is an —OH, a halogen, an ester, or

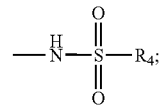

d is the number of $(SO_2X)_d$ attached to $E_1$;
   $P_1$, $P_2$, $P_3$, $P_4$ are each independently: absent, —O—, —S—, —SO—, —CO—, —$SO_2$—, —NH—, $NR_2$—, or —$R_3$—, and
   $R_2$ is $C_{1-25}$ alkyl, $C_{1-25}$ aryl or $C_{1-25}$ arylene;
   $R_3$ is $C_{1-25}$ alkylene, $C_{1-25}$ perfluoroalkylene, perfluoroalkyl ether, alkylether, or $C_{1-25}$ arylene;
   $R_4$ is trifluoromethyl, $C_{1-25}$ alkyl, $C_{1-25}$ perfluoroalkylene, $C_{1-25}$ aryl, or another $E_1$ group;
   $R_8(SO_2X)_d$ is a sulfonated aliphatic or aromatic containing moiety; and
   $Q_1$, $Q_2$ are each independently a fluorinated cyclobutyl moiety.

6. The polymer blend of claim 3 wherein the first polymer comprises segments 5 and 6:

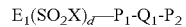
5

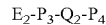
6 connected by a linking group $L_1$ to form polymer units 7 and 8:

7

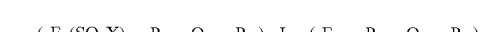
8 wherein:
   $E_1(SO_2X)_d$ is a sulfonated aromatic-containing moiety;
   $E_2$ is an unsulfonated aromatic-containing and/or aliphatic-containing moiety;
   $L_1$ is a linking group;
   X is an —OH, a halogen, an ester, or

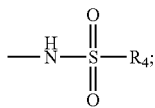

d is a number of (SO$_2$X) functional groups attached to E$_1$;

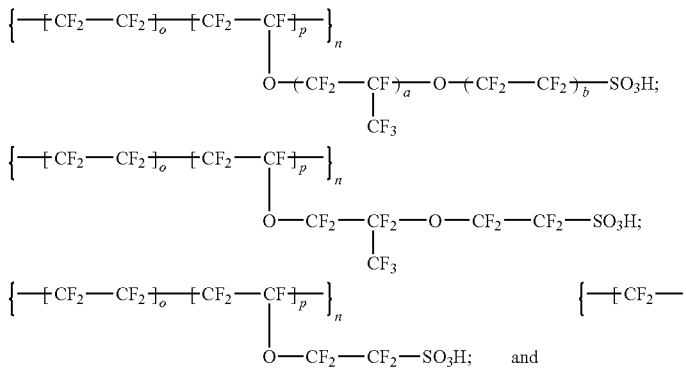

P$_1$, P$_2$, P$_3$, P$_4$ are each independently absent, —O—, —S—, —SO—, —SO$_2$—, —CO—, —NH—, NR$_2$—, —R$_3$—, and R$_2$ is C$_{1-25}$ alkyl, C$_{1-25}$ aryl or C$_{1-25}$ arylene;

R$_3$ is C$_{1-25}$ alkylene, C$_{1-25}$ perfluoroalkylene, or C$_{1-25}$ arylene;

R$_4$ is trifluoromethyl, C$_{1-25}$ alkyl, C$_{1-25}$ perfluoroalkylene, C$_{1-25}$ aryl, or another E$_1$ group;

Q$_1$, Q$_2$ are each independently a fluorinated cyclobutyl moiety;

i is a number representing repetition of polymer segment 1; and, j is a number representing repetition of a polymer segment 2.

7. The polymer blend of claim 3 wherein the first polymer comprises polymer segments 9 and 10:

E$_1$(SO$_2$X)$_d$—P$_1$-Q$_1$-P$_2$    9

E$_2$(SO$_2$X)$_f$—P$_3$    10 wherein:

E$_1$, E$_2$ is an aromatic or aliphatic-containing moiety wherein at least one of E$_1$ and E$_2$ include an aromatic group substituted with —SO$_2$X;

X is an —OH, a halogen, an ester, or

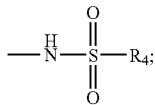

d is the number of (SO$_2$X) functional groups attached to E$_1$;

f is the number of (SO$_2$X) functional groups attached to E$_2$;

P$_1$, P$_2$, P$_3$ are each independently absent, —O—, —S—, —SO—, —SO$_2$—, —CO—, —NH—, NR$_2$—, —R$_3$—, and R$_2$ is C$_{1-25}$ alkyl, C$_{1-25}$ aryl or C$_{1-25}$ arylene;

R$_3$ is C$_{1-25}$ alkylene, C$_{1-25}$ perfluoroalkylene, perfluoroalkyl ether, alkyl ether, or C$_{1-25}$ arylene;

R$_4$ is trifluoromethyl, C$_{1-25}$ alkyl, C$_{1-25}$ perfluoroalkylene, C$_{1-25}$ aryl, or another E$_1$ group; and Q$_1$ is a fluorinated cyclobutyl moiety, with the proviso that when d is greater than zero, f is zero and when f is greater than zero d is zero.

8. The polymer blend of claim 1 wherein the second polymer is selected from the group consisting:

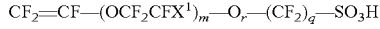

wherein:

o is 0 to 10;

p is greater or equal to 1;

n is greater than 10 a is from 0 to 3; and b is from 1 to 12.

9. The polymer blend of claim 1 wherein the second polymer comprises a copolymer containing a polymerization unit having the following formula:

CF$_2$=CF—(OCF$_2$CFX$^1$)$_m$—O$_r$—(CF$_2$)$_q$—SO$_3$H where m represents an integer of from 0 to 3, q represents an integer of from 1 to 12, r represents 0 or 1, and X$^1$ represents a fluorine atom or a trifluoromethyl group) and a polymerization unit based on tetrafluoroethylene.

10. The polymer blend of claim 1 further comprising a non-ionic polymer.

11. The polymer blend of claim 10 wherein the non-ionic polymer is a fluoro-elastomer.

12. The polymer blend of claim 1 wherein the first polymer is present in an amount from about 1 to about 99 weight percent.

13. The polymer blend of claim 1 wherein the first polymer is present in an amount from about 20 to about 80 weight percent.

14. The polymer blend of claim 1 wherein the first polymer is present in an amount from about 30 to about 70 weight percent.

15. The polymer blend of claim 1 wherein the second polymer is present in an amount from about 50 to about 95 weight percent.

16. The polymer blend of claim 1 wherein the second polymer is present in an amount from about 99 to about 1 weight percent.

17. The polymer blend of claim 1 wherein the second polymer is present in an amount from about 80 to about 20 weight percent.

18. The polymer blend of claim 1 wherein the second polymer is present in an amount from about 70 to about 30 weight percent.

* * * * *